(12) United States Patent
Kim et al.

(10) Patent No.: US 12,244,035 B2
(45) Date of Patent: Mar. 4, 2025

(54) BATTERY ASSEMBLY

(71) Applicant: SK ON CO., LTD., Seoul (KR)

(72) Inventors: Ji San Kim, Daejeon (KR); Yun Kyung Min, Daejeon (KR); Seo Roh Rhee, Daejeon (KR); Jong Chan Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/645,002

(22) Filed: Apr. 24, 2024

(65) Prior Publication Data

US 2024/0363952 A1     Oct. 31, 2024

(30) Foreign Application Priority Data

Apr. 27, 2023   (KR) .................. 10-2023-0055132
Apr. 2, 2024   (KR) .................. 10-2024-0044613

(51) Int. Cl.
*H01M 50/293*    (2021.01)
*H01M 10/653*    (2014.01)
*H01M 50/211*    (2021.01)
*H01M 50/242*    (2021.01)

(52) U.S. Cl.
CPC ....... *H01M 50/293* (2021.01); *H01M 10/653* (2015.04); *H01M 50/211* (2021.01); *H01M 50/242* (2021.01)

(58) Field of Classification Search
None
See application file for complete search history.

(56) References Cited

U.S. PATENT DOCUMENTS

| | | |
|---|---|---|
| 11,342,629 B2 | 5/2022 | Park et al. |
| 2018/0183117 A1 | 6/2018 | Cho et al. |
| 2020/0220124 A1 | 7/2020 | Park et al. |
| 2020/0277432 A1 | 9/2020 | Park et al. |
| 2020/0283565 A1 | 9/2020 | Cho et al. |
| 2021/0403700 A1* | 12/2021 | Ganapatibhotla ....... C08L 81/04 |

OTHER PUBLICATIONS

Extended European Search Report for European Patent Application No. 24172116.6, mailed Sep. 30, 2024 (5 pages).

* cited by examiner

*Primary Examiner* — Wyatt P McConnell
(74) *Attorney, Agent, or Firm* — Perkins Coie LLP (57) ABSTRACT

Provided is a battery assembly including: a battery housing; a battery cell assembly including a plurality of battery cells which are stacked and placed in the housing and are electrically connected; and a heat dissipation resin layer, and the battery assembly has minimized cell damage due to a swelling phenomenon occurring in a battery cell and an improved module life by controlling the physical properties of the low-hardness heat dissipation resin layer.

20 Claims, 2 Drawing Sheets

BATTERY ASSEMBLY

CROSS-REFERENCE TO RELATED APPLICATIONS

This patent document claims, under 35 U.S.C. § 119, the priority to, and benefits of, Korean Patent Application No. 10-2023-0055132, filed on Apr. 27, 2023 and Korean Patent Application No. 10-2024-0044613, filed on Apr. 2, 2024, the entire contents of which are incorporated by reference as part of the disclosure of this patent document.

TECHNICAL FIELD

The technology and implementations disclosed in this patent document generally relate to a battery assembly that includes a low-hardness heat dissipation resin layer.

BACKGROUND

A battery assembly may include a plurality of battery cells electrically connected and accommodated inside a case. The rapid growth of electric vehicles, hybrid vehicles, and energy storage systems (ESS) is leading to demands for battery assemblies with high energy density.

SUMMARY

The disclosed technology can be implemented in some embodiments to effectively release heat from a battery cell and a battery assembly by using a heat dissipation resin layer having specific physical properties, and to minimize the potential damage to battery cells in the battery assembly during a swelling phenomenon which occurs in a battery cell during charging and discharging of the battery cell.

The disclosed technology can be implemented in some embodiments to provide a battery assembly that includes a low-hardness heat dissipation resin layer disposed between a cell and a battery housing to suppress a cell flow that can result from vibration and external shock in a normal driving environment, thereby minimizing the potential damage to battery cells in the battery assembly.

In one general aspect, a battery assembly includes: a battery housing including at least one housing plate or housing wall; a cell assembly including a plurality of cells which are stacked and placed in the housing and are electrically connected; and a heat dissipation resin layer placed between the at least one housing plate and the cell assembly, wherein the heat dissipation resin layer has an adhesive shear strength of 0.2 MPa or more as measured in accordance with ASTM D1002 and satisfies the following Equation 1:

$$A = \left(\frac{E}{20}\right)^2 + \left(\frac{L}{30}\right)^{-0.75} < 2.3 \qquad \text{[Equation 1]}$$

wherein A is a softness index of the heat dissipation resin layer, E is a modulus of elasticity at a tensile speed of 5 mm/min in accordance with ASTM D638-14, Type 4, and L is an elongation at a tensile speed of 5 mm/min in accordance with ASTM D638-14, Type 4.

In an example embodiment of the disclosed technology, the heat dissipation resin layer may have the modulus of elasticity of 1 to 20 MPa as measured in accordance with ASTM D638-14.

In an example embodiment of the disclosed technology, the heat dissipation resin layer may have the elongation of 30 to 450% as measured in accordance with ASTM D638-14.

In an example embodiment of the disclosed technology, the heat dissipation resin layer may have the adhesive shear strength of 0.2 to 5.0 MPa as measured in accordance with ASTM D1002.

In an example embodiment of the disclosed technology, the heat dissipation resin layer may have a hardness shore A of 40 to 75 as measured in accordance with ASTM D2240. In some implementations, the term "hardness shore A" can be used to indicate a hardness value obtained using a shore (durometer) test.

In an example embodiment of the disclosed technology, the heat dissipation resin layer may include at least one selected from the group consisting of a urethane-based resin, an epoxy-based resin, a silicone-based resin, an acryl-based resin, an olefin-based resin, and an ethylene-vinyl acetate (EVA)-based resin.

In an example embodiment of the disclosed technology, the heat dissipation resin layer may have a thermal conductivity of 1 to 3 W/mK.

In an example embodiment of the disclosed technology, the heat dissipation resin layer may include at least one thermally conductive filler selected from the group consisting of alumina, aluminum hydroxide, silicon nitride, zinc oxide, magnesium oxide, boron nitride (BN), aluminum nitride (AlN), and silicon carbide (SiC).

In an example embodiment of the disclosed technology, the A value (the value of the A) may be 2.1 or less.

In an example embodiment of the disclosed technology, the housing may include at least one plate selected from an upper plate, a lower plate, a side plate, and an end plate.

In an example embodiment of the disclosed technology, the cell may be a pouch type.

In an example embodiment of the disclosed technology, the battery assembly may be a battery module or a battery pack.

Other features and aspects will be apparent from the following detailed description, the drawings, and the claims.

DETAILED DESCRIPTION

Section headings are used in the present document only for ease of understanding and do not limit scope of the embodiments to the section in which they are described.

Hereinafter, a battery assembly including a low-hardness heat dissipation resin layer based on some embodiments of the disclosed technology will be described in detail with reference to the attached drawings.

In some implementations discussed in this patent document, some units associated with weights can be used without mentioning they are associated with weights. As an example, a unit of ratio or % can be used to indicate a wt % or a weight ratio. The wt % refers to a weight percentage of a component in a composition relative to a weight of the composition.

In some implementations discussed in this patent document, a numerical range can include all values within the range including the lower limit and the upper limit, increments that can be logically derived, all possible combinations of the upper limit and the lower limit in the numerical range defined in different forms. Unless otherwise defined in this patent document, values outside a numerical range of a value (e.g., due to experimental errors or rounding off) may also be included in the defined numerical range.

In some implementations, the term "heat dissipation resin layer" may be used in the same sense as the term "heat dissipation adhesive layer" or the term "thermally conductive adhesive layer".

In some implementations, the term "battery assembly" may be used to indicate a battery module or a battery pack. In some implementations, the term "battery module" can be used to indicate a battery assembly that includes a plurality of battery cells. In some implementations, the term "battery pack" can be used to indicate a battery assembly that includes a plurality of battery modules, each of which includes a plurality of battery cells.

The disclosed technology can be implemented in some embodiments to provide a battery module that includes a low-hardness heat dissipation resin layer to improve surface pressure during swelling, minimizing the potential damage to the battery module and to a battery assembly including the battery module and securing vibration/shock stability.

In an embodiment of the disclosed technology, the battery assembly may include a battery housing including at least one housing plate or housing wall; a cell assembly located in the battery housing and structured to include a plurality of cells electrically connected to each other and disposed in the battery housing; and a heat dissipation resin layer placed between the at least one housing plate and the cell assembly. In some implementations, the term "cell" can be used to indicate a battery cell that can convert chemical energy to electrical energy.

In some implementations, the housing may include at least one plate selected from an upper plate, a lower plate, a side plate, and an end plate. In some implementations, the term "plate" can be used to indicate a housing plate or a housing wall that is a part of a battery housing.

In an example, the housing is a module housing, and the housing may include only the side plate. Here, the side plate may be connected with a strap, and the heat dissipation resin layer may be placed between the battery pack and the cell assembly.

In an example, the housing is a module housing, and the housing may include the side plate and the upper plate. Here, the heat dissipation resin layer may be placed between the battery pack and the cell assembly.

In an example, the housing is a module housing, and the housing may include the side plate, the upper plate, the lower plate, and the end plate. Here, the heat dissipation resin layer may be placed at least one of between the side plate and the outermost cell of the cell assembly, between the cell inside the module and the lower plate, and between the cell and the upper plate.

In an example, the housing may be a pack housing. In this case, the heat dissipation resin layer may be placed between the battery pack and the cell.

The heat dissipation resin layer may be disposed on at least a part of the surface in contact with the plate, and in some implementations, may be disposed on the entire surface. In an embodiment, the battery assembly may further include a cooling means.

In some implementations, in a battery module having a lower cooling structure in which the cooling means is placed in the lower portion of the module housing, in order to implement electrical insulating properties and/or excellent heat transfer properties, a flow path of cooling fluid may be formed in or on the housing lower plate.

When a battery assembly has a high energy density, a high-speed charging/discharging operation may generate a lot of heat. If the heat is not controlled, safety issues can arise. The disclosed technology can be implemented in some embodiments to provide a battery assembly with excellent heat dissipation performance that can allow rapid dispersion of heat produced in the battery assembly and effective dissipation of heat to the outside.

In an example implementation, a thermal conductive adhesive with high hardness characteristics and excellent mechanical properties can be used as a heat dissipation member. However, there is a risk that a cell surface can be damaged during a swelling phenomenon that causes a battery cell to swell during the charging and discharging of the battery cell, causing a battery life decrease.

In order to address these issues, the disclosed technology can be implemented in some embodiments to provide a heat dissipation member configured to maintain structural stability of a battery assembly and to effectively release heat accumulated in the battery assembly during the use.

Figure 1:
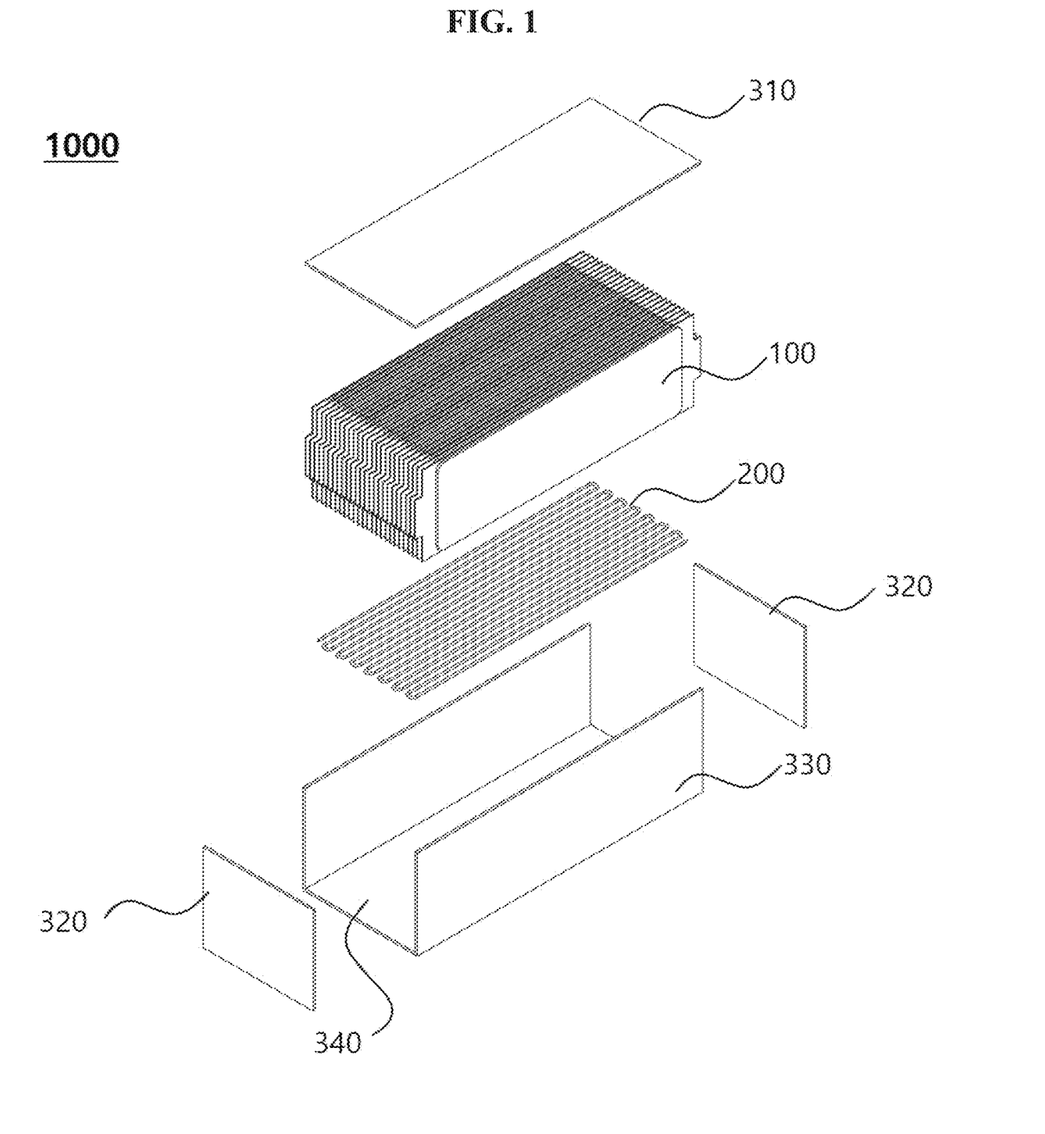
FIG. 1 is a perspective view showing a battery module including a heat dissipation resin layer and a battery cell.

FIG. 1 illustrates an example configuration of a battery assembly 1000. This battery assembly 1000 may include a cell assembly 100 and a heat dissipation resin layer 200 inside a battery housing 300 to dissipate heat from the cell assembly 100. The cell assembly 100 may include a plurality of battery cells such as rechargeable battery cells. The battery housing 300 may include an upper plate 310, an end plate 320, a side plate 330, and a lower plate 340. In the illustrated example in FIG. 1, the heat dissipation resin layer 200 may be disposed between the cell assembly 100 and the lower plate 340 of the battery housing 300. However, the heat dissipation resin layer 200 is not limited to this example, and, in another example, the heat dissipation resin layer 200 may be disposed between the side plate 330 and the outermost cell of the cell assembly 100 and/or between the cell assembly 100 and the upper plate 310. In some implementations, the heat dissipation resin layer 200 may be disposed on a part or all of the surface in contact with the battery cell. A high-hardness (or high-strength) thermally conductive adhesive that can be used in a battery module may cause damage to the cell (e.g., materials and structures inside the cell), which may eventually cause battery life reduction. However, the battery assembly implemented based on some embodiments of the disclosed technology may include the heat dissipation resin layer including a low-hardness heat dissipation adhesive, thereby effectively releasing heat produced in each cell and minimizing the damage that would have been caused to the cell. In this way, the life and stability of the battery module may be improved.

To this end, in some implementations, the heat dissipation resin layer has an adhesive shear strength of 0.2 MPa or more as measured in accordance with ASTM D1002, and may satisfy the following Equation 1:

$$A = \left(\frac{E}{20}\right)^2 + \left(\frac{L}{30}\right)^{-0.75} < 2.3 \qquad \text{[Equation 1]}$$

where A is a softness index of the heat dissipation resin layer, E is a modulus of elasticity at a tensile speed of 5 mm/min in accordance with ASTM D638-14, Type 4, and L is an elongation at a tensile speed of 5 mm/min in accordance with ASTM D638-14, Type 4. In some implementations, the term "ASTM" can be used to indicate a technical standard published by American Society for Testing and Materials (ASTM).

In some implementations, in Equation 1, the softness index of the heat dissipation resin layer "A" may be 2.1 or less or 2.0 or less. When the softness index satisfies the numerical range described above, an excellent heat dissipation function and a structural adhesive function are simultaneously implemented, thereby preventing or minimizing the potential damage to the outside and inside of the cell even under an environment where there is an external vibration or shock. In this way, the battery life and stability can be improved.

As the modulus of elasticity of the heat dissipation resin layer decreases, a battery cycle life may be improved. However, since the modulus of elasticity corresponds to the volume change of the battery cell and the heat dissipation resin layer is so vulnerable to vibration and shock, and thus, a range of the modulus of elasticity needs to be limited to a level which does not impair the battery cycle life, so that excellent durability may be secured. In addition, when both the elongation and the modulus of elasticity are low, the heat dissipation resin layer is highly likely to be broken and can be negatively affect the structure and performance of the battery, and thus, a range of the elongation needs to be limited to a level that can secure excellent impact resistance and does not cause degradation of the battery structure and performance. Therefore, in some embodiments of the disclosed technology, a correlation between the modulus of elasticity and the elongation is expressed as the softness index value A and may be appropriately controlled, thereby providing a battery assembly including the heat dissipation resin layer having optimized physical properties. In this way, the disclosed technology can be implemented in some embodiments to provide a battery assembly with excellent durability, an extended battery life, and improved stability while satisfying a predetermined shear strength value.

In addition, the heat dissipation resin layer may have a hardness shore A measured in accordance with ASTM D2240 that has a value less than 90, or less than 80, for example, a value ranging from 40 to 75. When the hardness is 90 or more, 80 or more, or more than 75, the cell associated with the heat dissipation resin layer may be easily damaged. By satisfying the hardness value range described above, the potential cell damage may be minimized and the durability of the heat dissipation resin layer may be secured.

In an example embodiment, a heat dissipation adhesive composition included in the heat dissipation resin layer shows a low hardness, and may be an elastic composite formed by mixing a binder that includes at least one of a urethane-based resin, an epoxy-based resin, an acryl-based resin, an olefin-based resin, and an ethylene-vinyl acetate (EVA)-based resin that is mixed in a high molecular polymerization manner and filler. In some implementations, the binder may be a urethane-based resin or a silicone-based resin, but the disclosed technology is not limited thereto as long as it satisfies the physical properties described later.

The urethane-based resin may be formed by mixing at least one hydroxyl group-containing compound and isocyanate. This urethane-based resin is a two-component polyurethane and can be distinguished from a one-component polyurethane having a urethane group in a single composition. The two-component polyurethane may be produced by reacting and curing a main agent including at least one hydroxyl group-containing compound and a curing agent selected from an aliphatic isocyanate, a cycloaliphatic isocyanate, and an aromatic isocyanate at room temperature. In some implementations, the term "room temperature" may be used to indicate a state of a material that is not particularly heated or cooled. In one example, the room temperature may refer to a temperature in a range of 10° C. to 30° C., for example, a temperature of 15° C. or higher, 18° C. or higher, 20° C. or higher, or 23° C. or higher and 27° C. or lower.

As an example, the curing reaction may be performed by using a catalyst such as dibutyltin dilaurate (DBTDL). The two-component polyurethane composition may include a physical mixture of a main agent component and a curing agent component, and may include a reacted product (cured product) of a main agent component and a curing agent component.

The at least one hydroxyl group-containing compound may be monool, diol, triol, or polyol, for example, may be selected from glycols including ethylene glycol (EG), propylene glycol (PG), 1,3-butanediol (1,3-BD), 1,4-butanediol (1,4-BD), neopentyl glycol (NPG), diethylene glycol (DEG), 3-methyl-1.5-pentanediol (MPD), or 1,6-hexanediol (1,6-HD); triols including trimethylolpropane (TMP) or glycerin; tetraols including pentaerythritol; polyether polyols including polyethylene glycol (PEG), polypropylene glycol (PPG), polyoxypropylene triol (GP), or polytetramethylene glycol (PTMG); polyester polyols which is a polycondensate of a basic acid including adipic acid, sebasic acid, or isophthalic acid and the glycols or polyester polyols including polycaprolactone polyol. More specifically, the at least one hydroxyl group-containing compound may be selected from aromatic polyester polyols exemplified by a polycondensate of isophthalic acid and the glycols; and aliphatic polyester polyols exemplified by polycaprolactone polyol or poly(1,4-butanediol adipate).

In an embodiment of the disclosed technology, the at least one hydroxyl group-containing compound may be a polyether polyol or a mixture containing the polyether polyol. As a non-limiting example, it may include poly (tetramethylene oxide glycol), polypropylene glycol, and a variant thereof.

The isocyanate may be a polyfunctional isocyanate, for example, diisocyanate, triisocyanate, and the like, and may be aliphatic, alicyclic, or aromatic isocyanate. In some implementations, the isocyanate may be ethylene diisocyanate; hexamethylene-1,6-diisocyanate (HDI); isophorone diisocyanate (IPDI); 4,4'-, 2,2'-, and 2,4'-dicyclohexylmethane diisocyanate (H12MDI); norbornene diisocyanate; 1,3- and 1,4-(bisisocyanatomethyl)cyclohexane (including cis- or trans-isomers thereof); tetramethylene-1,4-diisocyanate (TMXDI); 1,12-dodecane diisocyanate; 2,2,4-trimethylhexamethylene diisocyanate; 2,2'-, 2,4'-, and 4,4'-methylenediphenyl diisocyanate (MDI); carbodiimide-modified MDI; 2,4- and 2,6-toluene diisocyanate (TDI); 1,3- and 1,4-phenylene diisocyanate; 1,5-naphthalene diisocyanate; triphenylmethane-4,4',4"-triisocyanate; or polyphenylpolymethylene polyisocyanate.

The silicone-based resin may refer to a polymer compound including a siloxane bond as a main skeleton. For example, the silicone-based resin may be a polydimethylsiloxane resin, or may be produced by reacting and curing a main agent including a polydimethylsiloxane-based polymer and a curing agent at room temperature. For example, the polydimethylsiloxane-based polymer may be a divinylmethyl group-terminated polydimethylsiloxane, and the curing agent may be a dimethylsiloxane-methylhydrogensiloxane copolymer.

The filler is a thermally conductive filler, and may include at least one selected from the group consisting of alumina, aluminum hydroxide, silicon nitride, zinc oxide, magnesium oxide, boron nitride (BN), aluminum nitride (AlN), silicon carbide (SiC), and a mixture of one or more of alumina, aluminum hydroxide, silicon nitride, zinc oxide, magnesium oxide, BN, AlN, and SiC. A form or ratio of the filler is not particularly limited, and may be adjusted considering the viscosity of a urethane-based resin composition, a sedimentation possibility in a cured resin layer of the composition, thermal resistance, thermal conductivity, dispersibility, or others.

The heat dissipation resin layer may be formed by curing a resin composition including the urethane-based resin mixed with the filler described above, or a resin composition including the silicone-based resin mixed with the filler at room temperature for a certain period of time. In other implementations, heat is applied for a certain period of time to the extent that can promote curing while maintaining the thermal stability of the cell. For example, heat of a temperature lower than 60° C., specifically in a range of 30° C. to 50° C. may be applied before curing or during the curing process, before storing the battery cell, or during a storage process.

In an example embodiment, the heat dissipation resin layer may include 10 to 150 parts by weight of the resin component and 100 parts by weight of the filler. In another example embodiment, the heat dissipation resin layer may include 20 to 100 parts by weight of the resin component and 100 parts by weight of the filler.

In addition, the resin composition may further include a viscosity modifier for increasing or decreasing viscosity, or adjusting viscosity depending on shear strength, for example, a thixotropic agent, a diluent, a dispersant, a surface treatment agent, a coupling agent.

The thixotropic agent may adjust viscosity depending on the shear strength of the resin composition to allow the manufacturing process of the battery module to be effectively done. In some implementations, it may be fumed silica and the like.

The diluent or the dispersant is usually used for decreasing the viscosity of the resin composition, and any type of diluent or dispersant may be used without limitation as long as it may exhibit the features described above.

The surface treatment agent may be used for treating the surface of the filler introduced to the heat dissipation resin layer, and any type of surface treatment agent may be used without limitation.

The coupling agent may be used for improving the dispersibility of the thermally conductive filler, such as alumina, and any type of coupling agent may be used without limitation.

In other implementations, the resin composition may further include a flame retardant or a flame retardant auxiliary. In this case, any type of flame retardant may be used without particular limitation, and specifically, for example, a flame retardant in a solid filler form or a liquid flame retardant may be used. The flame retardant may be an organic flame retardant such as melamine cyanurate, an inorganic flame retardant such as magnesium hydroxide, or others. When an amount of the filler filled in the heat dissipation resin layer is large, liquid type triethyl phosphate (TEP), tris(1,3-chloro-2-propyl)phosphate) (TCPP), and others may be used. In addition, a silane coupling agent which may act as a flame retardant enhancer may be added.

The resin composition may have a viscosity of 100,000 cP to 500,000 cP, as measured at room temperature.

In an example embodiment, the heat dissipation resin layer including the thermally conductive filler may have a thermal conductivity of 1 W/mK or more, specifically 1 to 3 W/mk to increase battery cell cooling efficiency of a cooling means.

The heat dissipation resin layer based on some embodiments of the disclosed technology may further satisfy at least one of the following physical properties:
a) a modulus of elasticity measured in accordance with ASTM D638-14 of 1 to 20 MPa;
b) an elongation measured in accordance with ASTM D638-14 of 30 to 450%, 40 to 300%, 50 to 250%, 80 to 230%, or 90 to 220%; and
C) an adhesive shear strength measured in accordance with ASTM D1002 of 0.2 to 5.0 MPa.

In some implementations, a battery module or battery pack including the heat dissipation resin layer satisfying the physical properties discussed above may have an excellent structural stability even in a situation where there is an external vibration and shock, and may exhibit an effect of improving surface pressure during swelling and may prevent the potential damage to the cell surface.

In an example embodiment, the heat dissipation resin layer may be disposed between the cell and the side plate of the housing, between the cell and the lower plate, or between the cell and the upper plate. In some implementations, the thickness of the heat dissipation resin layer is not limited, but may be specifically 0.1 to 20 mm, 0.2 to 10 mm, or 0.3 to 5 mm.

FIG. 1 illustrates a heat dissipation resin layer 200 placed in an applied state between a plurality of battery cells 100 and a lower plate 340 included in a battery assembly 1000 based on some embodiments of the disclosed technology.

The heat dissipation resin layer 200 may provide at least one property, including insulation, adhesion, and thermal conduction, and in addition to what is illustrated in FIG. 1, the heat dissipation resin layer 200 may be disposed between the outermost cell and the side plate of the housing or between the upper plate of the housing and the cell. In one example, the heat dissipation resin layer 200 may have a serpentine shape as illustrated in FIG. 1.

Figure 2:
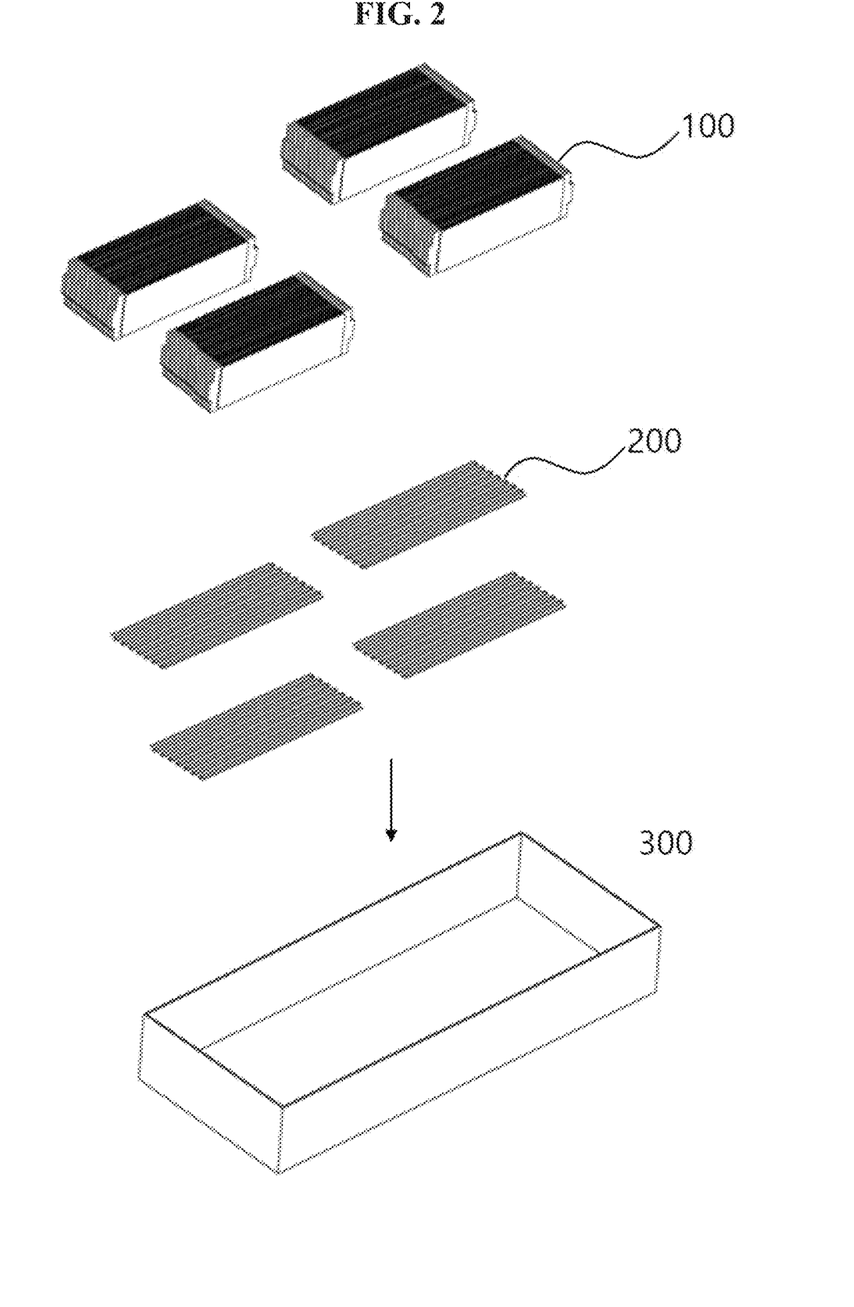
FIG. 2 is a perspective view showing a battery pack including a heat dissipation resin layer and a battery cell.

FIG. 2 illustrates an example configuration where a heat dissipation resin layer is mounted between the plurality of battery cells 100 and a battery pack included in the battery assembly 1000 based on some embodiments of the disclosed technology. In this case, a module-less or cell to pack method may be applied, and the heat dissipation resin layer may be placed at least one of between the upper plate of the battery housing and the cell, between the lower plate and the cell, between the side plate and the cell, and between the end plate and the cell.

In some embodiments of the disclosed technology, an adhesive strength of 0.2 MPa or more or 0.5 MPa or more may be secured. In some implementations, the adhesive strength may be 0.2 to 5.0 MPa or 0.5 to 3.0 MPa. In this case, various materials that constitute components of the battery assembly, the battery module, and the battery pack, such as a case, a battery cell, and a vehicle chassis may exhibit excellent adhesive performance, and exfoliation of the heat dissipation resin layer may be prevented even when there is a volume change in the battery cell due to gassing during the charging and discharging of the battery cell, thereby improving the durability of the battery assembly, the battery module, and the battery pack.

In some embodiments of the disclosed technology, the battery cell forming the battery module may be a pouch type cell.

The battery cell undergoes a volume change by intercalation and deintercalation of an electrode material during the charging and discharging of the battery cell, and when the volume expansion of the battery cell is severe, a pouch type case may be damaged and even when gas eruption or explosion occurs, direct damage may occur even to an adjacent cell.

The heat dissipation adhesive composition based on some embodiments of the disclosed technology is injected into the case of the battery module and brought into contact with one or more battery cells in the battery module, thereby fixing the battery cell in the module case. Specifically, the heat dissipation adhesive composition may be disposed: between the cell and the side plate of the housing; between the lower plate of the housing and the cell; and/or between the upper plate of the housing and the cell. The heat dissipation resin layer formed after being formed on part of the surface or the entire surface between the cell and the plate and cured may prevent a cell flow due to shock and vibration and may prevent damage from occurring outside and inside the cell due to external shock and vibration, and may effectively release heat produced during the charging and discharging of the battery cell to prevent the problems described above.

In addition, a battery pack implemented based on some embodiments of the disclosed technology may include two or more of the battery modules. The battery modules in the battery pack may be electrically connected. In some implementations, the heat dissipation adhesive composition may be disposed inside the battery pack to fix the module and to effectively transfer heat.

The battery pack may be used in devices of all purposes that use a secondary battery as a power source. As a specific example, the battery pack implemented based on some embodiments of the disclosed technology can be used in electric or hybrid vehicles, but the disclosed technology is not limited thereto.

Hereinafter, some embodiments of the disclosed technology will be described in detail by way example only. The following examples and the experimental results to describe some embodiments of the disclosed technology described in this patent document in more detail, and the disclosed technology should not be construed as being limited thereto.
(Evaluation Method of Physical Properties)
1. Measurement of Modulus of Elasticity and Elongation Evaluation was performed in accordance with ASTM D638-14, and a type 4 specimen having a thickness of 3 mm was manufactured. A tensile speed was 5 mm/min, the specimen was tensioned at a constant speed until a breaking point, and force and strain measured therefrom were recorded. The modulus of elasticity was calculated using a strain and a stress at a point of 0.5%-3.0%, and the elongation was recorded as a value at the breaking point of the specimen.
2. Measurement of Hardness Evaluation was performed in accordance with ASTM D2240, and a flat specimen having a width of 25 mm, a length of 25 mm, and a thickness of 5 mm or more was manufactured. Measurement was performed using hardness measuring equipment with a shore A unit, and hardness was evaluated by a value stabilized after 20 seconds of pressing a specimen surface, and 5 points of the specimen were measured and their average was recorded.
3. Measurement of Adhesive Shear Strength A flat plate having a width of 25 mm and a length of 100 mm was manufactured with an aluminum case having an insulation film formed, a heat dissipation resin layer was applied with a thickness of 0.3 mm, a width of 25 mm, and a length of 25 mm on the flat plate, and the two flat plates were put together to manufacture a specimen and evaluation was performed. The specimen was cured for 72 hours, fastened to tensile tester, and tensioned at a constant speed to a breaking point at a speed of 12.7 mm/min, and a maximum force measured was recorded.
4. Measurement of Thermal Conductivity Evaluation was performed in accordance with ISO 22007-2, and a flat specimen having a width of 50 mm, a length of 50 mm, and a thickness of 5 mm was manufactured. A hot disk sensor was placed between the two specimens and stabilized at a reference temperature of 25° C., and then a thermal conductivity was measured.

Example 1

An aliphatic polyester polyol as a main agent and a cycloaliphatic isocyanate as a curing agent were mixed at an equivalence ratio of 1:1.05 and a volume ratio of 1:1 as a two-component urethane-based adhesive composition, and alumina and aluminum hydroxide solid content (weight ratio of alumina:aluminum hydroxide=2:8) were mixed at 220 parts by weight based on 100 parts by weight of the resin to prepare a resin composition which showed a modulus of elasticity of 20 MPa and an adhesive strength of 3.0 MPa and had a viscosity at room temperature of about 450,000 cP after 72 hours of curing at 25° C., which was applied to a battery module as a heat dissipation resin layer. A polycaprolactone polyol was used as the aliphatic polyester polyol, and an isophorone diisocyanate (IPDI) was used as the cycloaliphatic isocyanate.

Example 2

A resin composition having a viscosity at room temperature of about 250,000 cP was prepared in the same manner as in Example 1, except that a poly(1,4-butanediol adipate) which is an aliphatic polyester polyol was used as the main agent, a hexamethylene-1,6-diisocyanate (HDI) which is an aliphatic isocyanate was used as the curing agent and the modulus of elasticity of 1 MPa and the adhesive strength of 0.5 MPa were shown, and was applied as the heat dissipation resin layer to the battery module.

Example 3

A resin composition having a viscosity at room temperature of about 200,000 cP was prepared in the same manner as in Example 1, except that a poly(1,4-butanediol adipate) which is an aliphatic polyester polyol was used as the main agent and the modulus of elasticity of 10 MPa and the adhesive strength of 2 MPa were shown, and was applied as the heat dissipation resin layer to the battery module.

Example 4

A divinylmethyl group-terminated polydimethylsiloxane as a main agent and a dimethylsiloxane-methylhydrogensiloxane copolymer as a curing agent were mixed at an equivalence ratio of 1:1 as a two-component silicone-based adhesive composition, and alumina and aluminum hydroxide solid content (weight ratio of alumina:aluminum hydroxide=8:2) were mixed at 230 parts by weight based on 100 parts by weight of the resin to prepare a resin composition which showed a modulus of elasticity of 5 MPa and an adhesive strength of 1.5 MPa and had a viscosity at room temperature of about 130,000 cP after 72 hours of curing at 25° C., which was applied to the battery module as the heat dissipation resin layer.

Example 5

A resin composition having a viscosity at room temperature of about 300,000 cP was prepared in the same manner as in Example 4, except that alumina and aluminum hydroxide solid content (weight ratio of alumina:aluminum hydroxide=5:5) were mixed at 300 parts by weight based on 100 parts by weight of the resin and the modulus of elasticity of 2 MPa and the adhesive strength of 0.7 MPa were shown, and was applied as the heat dissipation resin layer to the battery module.

Comparative Example 1

A polycarbonate polyol as a main agent and an aromatic isocyanate as a curing agent were mixed at an equivalence ratio of 1:1.05 and a volume ratio of 1:1 as a two-component urethane-based adhesive composition, and alumina and aluminum hydroxide solid content (weight ratio of alumina: aluminum hydroxide=2:8) were mixed at 220 parts by weight based on 100 parts by weight of the resin to prepare a resin composition which showed a modulus of elasticity of 100 MPa and an adhesive strength of 4.0 MPa and had a viscosity at room temperature of about 500,000 cP after 72 hours of curing at 25° C., which was applied to the battery module as the heat dissipation resin layer. A 4,4'-methylenediphenyl diisocyanate (MDI) was used as the aromatic isocyanate.

Comparative Example 2

A resin composition having a viscosity at room temperature of about 250,000 cP was prepared in the same manner as in Comparative Example 1, except that an isophorone diisocyanate (IPDI) which is a cycloaliphatic isocyanate was used as the curing agent and the modulus of elasticity of 50 MPa and the adhesive strength of 3.0 MPa were shown, and was applied as the heat dissipation resin layer to the battery module.

Comparative Example 3

A resin composition having a viscosity at room temperature of about 300,000 cP was prepared in the same manner as in Example 1, except that a polypropylene glycol which is an aliphatic polyether polyol as the main agent and a hexamethylene-1,6-diisocyanate (HDI) which is an aliphatic isocyanate as the curing agent were used and the modulus of elasticity of 0.5 MPa and the adhesive strength of 0.1 MPa were shown, and was applied as the heat dissipation resin layer to the battery module.

Comparative Example 4

A resin composition having a viscosity at room temperature of about 450,000 cP was prepared in the same manner as in Example 4, except that alumina and aluminum hydroxide solid content (weight ratio of alumina:aluminum hydroxide=2:8) were mixed at 400 parts by weight based on 100 parts by weight of the resin and the modulus of elasticity of 0.5 MPa and the adhesive strength of 0.1 MPa were shown, and was applied as the heat dissipation resin layer to the battery module.

(Manufacture of Battery Module)

The resin compositions prepared according to Examples 1 to 5 and Comparative Examples 1 to 4 were introduced between the lower plate and the cell in the aluminum module case in which pouch type battery cells were stacked and stored, and applied between the cell and the case, thereby manufacturing a battery module in which the heat dissipation resin layer was formed.

[Experimental Example 1] Evaluation of Battery Module

1. Evaluation of Battery Structural Performance

A battery module was fastened to an impact tester, and then an impact load in each axis direction of the module was applied, and thereafter, the battery module was fastened to a vibration tester to apply a vibration load. After evaluating vibration and impact, it was confirmed whether the outside of the module was damaged, whether the heat dissipation resin layer was cracked or broken, or a module voltage was abnormal. The results are shown in the following Table 1.

<Evaluation Criteria of Structural Performance>
  ○: no damage to the outside of the module, no crack and breakage in the heat dissipation resin layer, and no abnormal voltage in the module.
  x: occurrence of one of damage to the outside of the module, crack and breakage in the heat dissipation resin layer, and abnormal voltage in the module.

2. Evaluation of Battery Reliability

A fully charged battery module was connected to a charger/discharger in a constant temperature and humidity chamber at 30 to 35° C., and a cycle test was performed with constant charge current and discharge current. Charging and discharging were performed up to 800 to 1200 times, and insulation breakdown of the module and a remaining capacity of the module were measured every 100 cycles. After finishing the charge and discharge test, it was determined whether the insulation of the battery module was broken, a cell electrolyte solution was leaked, cell appearance was damaged, and the inside of the cell was damaged.

<Evaluation Criteria of Reliability Depending on Cycle>
  ○: no insulation breakdown of the battery module, no leakage of the cell electrolyte solution, no damage to the cell appearance, and no damage to the inside of cell.
  x: occurrence of one or more of insulation breakdown of the battery module, leakage of the cell electrolyte solution, damaged cell appearance, and damaged inside of cell.

TABLE 1

|  | Hardness (Shore A) | Viscosity (cP) | Adhesive shear strength (MPa) | Modulus of elasticity (MPa) | Elongation (%) | Softness index A $(E/20)^2 + (L/30)^{-0.75}$ | Structural performance | Reliability |
|---|---|---|---|---|---|---|---|---|
| Example 1 | 70 | 450,000 | 3.0 | 20 | 90 | 1.439 | ○ | ○ |
| Example 2 | 40 | 250,000 | 0.5 | 1 | 220 | 0.227 | ○ | ○ |
| Example 3 | 70 | 200,000 | 2.0 | 10 | 120 | 0.604 | ○ | ○ |
| Example 4 | 60 | 130,000 | 1.5 | 5 | 150 | 0.362 | ○ | ○ |

TABLE 1-continued

|  | Hardness (Shore A) | Viscosity (cP) | Adhesive shear strength (MPa) | Modulus of elasticity (MPa) | Elongation (%) | Softness index A $(E/20)^2 + (L/30)^{-0.75}$ | Structural performance | Reliability |
|---|---|---|---|---|---|---|---|---|
| Example 5 | 45 | 300,000 | 0.7 | 2 | 190 | 0.260 | ○ | ○ |
| Comparative Example 1 | 97 | 500,000 | 4.0 | 100 | 10 | 27.280 | ○ | X |
| Comparative Example 2 | 89 | 250,000 | 3.0 | 50 | 20 | 7.605 | ○ | X |
| Comparative Example 3 | 30 | 300,000 | 0.1 | 0.5 | 30 | 1.001 | X | ○ |
| Comparative Example 4 | 40 | 450,000 | 0.1 | 0.5 | 25 | 1.147 | X | ○ |

The disclosed technology can be implemented in the above disclosed embodiments to provide a battery assembly that includes a low-hardness heat dissipation resin layer showing specific physical properties that can prevent damage to an outer surface of the cell that would have occurred due to swelling caused during high-speed charging and discharging of a battery.

In addition, the disclosed technology can be implemented in some embodiments to minimize the insulation breakdown of a battery assembly or a risk of leakage of a cell electrolyte solution, thereby extending the lifespan of the battery assembly.

In addition, the disclosed technology can be implemented in some embodiments to provide a battery assembly that includes the low-hardness heat dissipation resin layer, thereby suppressing a cell flow that would have occurred due to vibration and external shock in a certain car driving environment, and accordingly damage may be prevented from occurring outside and inside the cell.

The disclosed technology can be implemented in rechargeable secondary batteries and battery modules that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in various power sources and power supplies, thereby mitigating climate changes in connection with uses of power sources and power supplies. Secondary batteries or battery modules based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A battery assembly comprising:
a battery housing including at least one housing plate;
a battery cell assembly located in the battery housing and structured to include a plurality of battery cells electrically connected to each other; and
a heat dissipation resin layer placed between the at least one housing plate and the battery cell assembly,
wherein the heat dissipation resin layer has an adhesive shear strength of at least 0.2 MPa as measured in accordance with ASTM D1002 and satisfies the following Equation 1:

$$A = \left(\frac{E}{20}\right)^2 + \left(\frac{L}{30}\right)^{-0.75} < 2.3 \quad \text{[Equation 1]}$$

wherein A is a softness index of the heat dissipation resin layer, E is a modulus of elasticity at a tensile speed of 5 mm/min in accordance with ASTM D638-14, Type 4, and L is an elongation at a tensile speed of 5 mm/min in accordance with ASTM D638-14, Type 4, and wherein the elongation of the heat dissipation resin layer is in a range from 50% to 450% as measured in accordance with ASTM D638-14.

2. The battery assembly of claim 1, wherein the heat dissipation resin layer has the modulus of elasticity of 1 to 20 MPa as measured in accordance with ASTM D638-14.

3. The battery assembly of claim 1, wherein the adhesive shear strength of the heat dissipation resin layer is in a range from 0.2 to 5.0 MPa as measured in accordance with ASTM D1002.

4. The battery assembly of claim 1, wherein the heat dissipation resin layer has a hardness shore A value of 40 to 75 as measured in accordance with ASTM D2240.

5. The battery assembly of claim 1, wherein the heat dissipation resin layer includes at least one selected from the group consisting of a urethane-based resin, an epoxy-based resin, a silicone-based resin, an acryl-based resin, an olefin-based resin, and an ethylene-vinyl acetate-based resin.

6. The battery assembly of claim 1, wherein the heat dissipation resin layer has a thermal conductivity of 1 to 3 W/mk.

7. The battery assembly of claim 6, wherein the heat dissipation resin layer includes at least one thermally conductive filler selected from the group consisting of alumina, aluminum hydroxide, silicon nitride, zinc oxide, magnesium oxide, boron nitride, aluminum nitride, and silicon carbide.

8. The battery assembly of claim 1, wherein a value of the A in Equation 1 is 2.1 or less.

9. The battery assembly of claim 1, wherein the battery housing includes at least one of an upper housing plate, a lower housing plate, a side housing plate, and an end housing plate.

10. The battery assembly of claim 1, wherein the battery cell is a pouch type battery cell.

11. The battery assembly of claim 1, wherein the battery assembly is a battery module or a battery pack.

12. A battery pack comprising:
a battery housing including at least one housing plate; and
a plurality of battery modules disposed in the battery housing, each battery module including: a battery cell assembly that includes a plurality of battery cells electrically connected to each other; and a heat dissipation resin layer placed between the at least one housing plate and the battery cell assembly to dissipate heat from the battery cell assembly,
wherein the heat dissipation resin layer has an adhesive shear strength of at least 0.2 MPa as measured in accordance with ASTM D1002 and satisfies the following Equation 1:

$$A = \left(\frac{E}{20}\right)^2 + \left(\frac{L}{30}\right)^{-0.75} < 2.3 \quad \text{[Equation 1]}$$

wherein A is a softness index of the heat dissipation resin layer, E is a modulus of elasticity at a tensile speed of 5 mm/min in accordance with ASTM D638-14, Type 4, and L is an elongation at a tensile speed of 5 mm/min in accordance with ASTM D638-14, and
wherein the elongation of the heat dissipation resin layer is in a range from 50% to 450% as measured in accordance with ASTM D638-14.

13. The battery pack of claim 12, wherein the heat dissipation resin layer has the modulus of elasticity of 1 to 20 MPa as measured in accordance with ASTM D638-14.

14. The battery pack of claim 12, wherein the adhesive shear strength of the heat dissipation resin layer is in a range from 0.2 to 5.0 MPa as measured in accordance with ASTM D1002.

15. The battery pack of claim 12, wherein the heat dissipation resin layer has a hardness shore A value of 40 to 75 as measured in accordance with ASTM D2240.

16. The battery pack of claim 12, wherein the heat dissipation resin layer includes at least one selected from the group consisting of a urethane-based resin, an epoxy-based resin, a silicone-based resin, an acryl-based resin, an olefin-based resin, and an ethylene-vinyl acetate-based resin.

17. The battery pack of claim 12, wherein the heat dissipation resin layer has a thermal conductivity of 1 to 3 W/mk.

18. The battery pack of claim 12, wherein a value of the A in Equation 1 is 2.1 or less.

19. A battery assembly comprising:
a battery housing including at least one housing plate;
a battery cell assembly located in the battery housing and structured to include a plurality of battery cells electrically connected to each other; and
a heat dissipation resin layer placed between the at least one housing plate and the battery cell assembly,
wherein the heat dissipation resin layer has an adhesive shear strength of at least 0.2 MPa as measured in accordance with ASTM D1002 and satisfies the following Equation 1:

$$A = \left(\frac{E}{20}\right)^2 + \left(\frac{L}{30}\right)^{-0.75} < 2.3 \quad \text{[Equation 1]}$$

wherein A is a softness index of the heat dissipation resin layer, E is a modulus of elasticity at a tensile speed of 5 mm/min in accordance with ASTM D638-14, Type 4, and L is an elongation at a tensile speed of 5 mm/min in accordance with ASTM D638-14, Type 4, and
wherein the heat dissipation resin layer includes at least one selected from the group consisting of a urethane-based resin, a silicone-based resin, an acryl-based resin, an olefin-based resin, and an ethylene-vinyl acetate-based resin.

20. The battery assembly of claim 19, wherein a value of the A in Equation 1 is 0.604 or less.

* * * * *